United States Patent [19]

Noda

[11] Patent Number: 4,618,106
[45] Date of Patent: Oct. 21, 1986

[54] FISHING REEL WITH FRICTION AND MAGNETIC BRAKES

[75] Inventor: Hideo Noda, Sakai, Japan

[73] Assignee: Shimano Industrial Company Limited, Osaka, Japan

[21] Appl. No.: 604,595

[22] Filed: Apr. 27, 1984

[30] Foreign Application Priority Data

Apr. 27, 1983 [JP] Japan ............... 58-63332

[51] Int. Cl.$^4$ .................................... A01K 89/02
[52] U.S. Cl. .................. 242/84.5 R; 242/84.52 B
[58] Field of Search .............. 242/84.5 R, 84.51 R, 242/84.52 R, 84.52 B, 84.52 C, 211, 212, 213, 214, 216, 217, 218, 219, 220, 221

[56] References Cited

U.S. PATENT DOCUMENTS

| | | | |
|---|---|---|---|
| 2,347,173 | 4/1944 | Coxe et al. | 242/84.5 R |
| 2,465,932 | 3/1949 | Romine | 242/84.52 B |
| 2,478,111 | 8/1949 | Kilian | 242/84.51 R |
| 2,553,200 | 5/1951 | Mandolf et al. | 242/212 |
| 2,573,240 | 10/1951 | Berlinger | 242/84.5 R |
| 3,432,114 | 3/1969 | Meisner | 242/214 |
| 4,402,470 | 9/1983 | Hamayasu | 242/84.52 R |

Primary Examiner—Billy S. Taylor
Attorney, Agent, or Firm—Stevens, Davis, Miller & Mosher

[57] ABSTRACT

A fishing reel wherein a spool is rotatably supported on a spool shaft mounted between first and second side frames. A cast-control member is supported on the second side frame and positioned at one axial side of the spool. The cast-control member is movable axially of the spool and has an operating portion operable outside the second side frame. A contact member has an annular contact portion for contacting the cast-control member. The contact member is held at an axial outer face of the spool such that the contact member does not rotate relative to the spool. When the cast-control member is moved axially with respect to the spool to contact the contact member, the cast-control member applies a rotation resisting force by means of the contact member to the spool with respect to free rotation thereof.

2 Claims, 3 Drawing Figures

FISHING REEL WITH FRICTION AND MAGNETIC BRAKES

FIELD OF THE INVENTION

The invention relates to a fishing reel and more particularly, to a fishing reel wherein a spool shaft is supported between first and second side frames, and a spool is freely rotatably supported to the spool shaft by means of a pair of bearings.

BACKGROUND OF THE INVENTION

Conventionally, in a fishing reel, wherein between the first and second side frames is supported the spool shaft carrying the spool freely rotatably, the reel includes a drive mechanism for driving the spool, and a clutch for making free the spool from the drive mechanism, so that the clutch can be engaged to thereby cause the spool to be in associated motion with the drive mechanism, whereby a driving operation thereof rotates the spool to wind up the fishing line onto the trunk of the spool, while the clutch can be disengaged to cause the spool to freely rotate for the purpose of a casting operation to draw out the wound line from the spool.

Upon the casting operation, the wound line on the spool is drawn out therefrom thanks to the weight of the fishing rig put at the utmost end of the fishing line. In such instance, the speed of free rotation of the spool becomes higher than that of the drawingout of the line, thereby causing a so-called backlash of the fishing line which is thereby entangled and caught between the spool and the reel body.

To solve this problem, a feature has been conventionally proposed whereby a cast-control member is provided at one axial side of the spool, and the spool shaft is adapted to support at its corresponding end a transmission cylinder axially movably, so that the operating force of the cast-control member is transmitted to the spool through the transmission cylinder and an outer race of a ball bearing for journalling the spool. However, when a rotation resistance is applied to the spool by the cast-control member in the conventional reel, the ball bearing is subjected to a load, particularly to a thrust load between the inner race and the outer race at the bearing, resulting in a deterioration of the bearing (and the spool resultantly) in their rotation efficiency, generation of loud noises and a not-smooth heavy rotation with a shake.

SUMMARY OF THE INVENTION

An object of the invention is to improve the cast-control means of the conventional fishing reel to thereby provide that the operating force of the cast-control member can be transmitted directly to the spool but not through the transmission cylinder and the outer race of the bearing as in the above said conventional feature, thereby preventing the bearing from being subjected to a thrust load as of the abovesaid conventional feature and eliminating an application of load to the bearing portions, then enabling the spool to smoothly freely rotate and preventing generation of noises and a not-smooth heavy rotation with a shake at the bearing portions and the spool resultantly.

The invention relates to a fishing reel wherein a spool shaft is supported between first and second side frames, and a spool is freely rotatably supported to the spool shaft by means of a pair of bearings. The invention is characterized in this fishing reel in respect of that a cast-control member of a cast-control means is supported to a second side frame at one axial side of the spool in relation of being movable axially of the spool, and a contact member having an annular contact portion for contacting the cast-control member is formed to be held at an axial outer face of the spool relatively notrotatably, so that the cast-control member when operated moves to contact with the contact member so as to apply a rotation resistance directly to the spool with respect to its free rotation.

Thus, according to the invention, the operating force of the cast-control member is transmitted to the spool directly but not through the inner race and outer race of the bearing supporting the spool, so that the invention can eliminate that the bearing is affected by the thrust load, thereby eliminating a notsmooth heavy rotation with a shake in the bearing (and the spool resultantly) due to the thrust load and preventing a generation of noises, and enabling the spool to always smoothly rotate.

These and other objects and novel features of the invention will be more apparent upon a reading of the following detailed description and and the accompanying drawings.

DETAILED DESCRIPTION OF THE INVENTION

Figure 1:
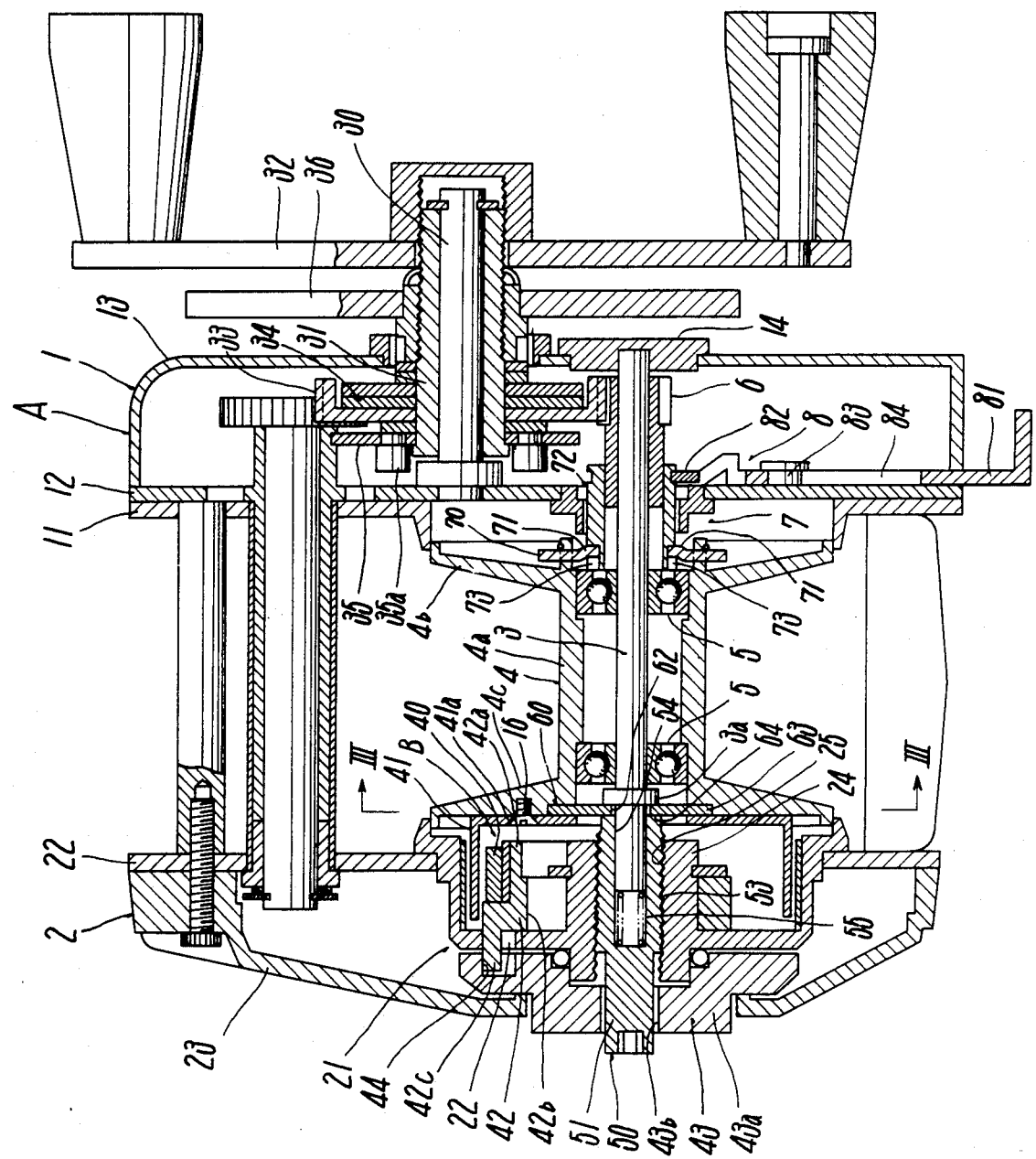
FIG. 1 is a sectional view showing an embodiment of a fishing reel of the invention.
Figure 2:
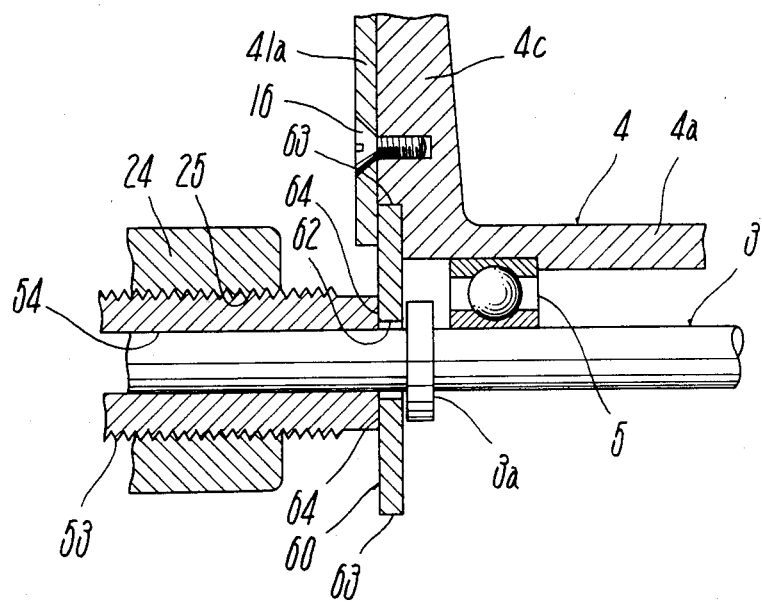
FIG. 2 is an enlarged sectional view of principal parts.

A reel body A forms a base of the fishing reel of the invention and comprises a pair of first and second side frames 1, 2 which oppose each other at a predetermined spacing. The first side frame 1 comprises a side plate 11, a doubling plate 12 attached outside thereof, and a cup-shaped cover 13 having a bearing member 14.

The second side frame 2 comprises a side plate 22 having at the center a bearing housing 21, and a cup-shaped cover 23 attached outside of the side plate 22. The first and second side frames 1, 2 are integrally connected by a connecting member 15.

In the reel shown in FIG. 1, the bearing housing 21 houses therein a magnetic brake B comprising an electric conductor 41 and a magnet 40 opposite thereto.

A spool shaft 3 is supported between a boss 24 formed at the bearing housing 21 (at the second side frame 2) and the bearing member 14 at the first side frame 1 in the reel body A constructed as abovesaid. A spool 4 is rotatably supported to the spool shaft 3 at its central portion by means of a pair of bearings 5, 5, with spool 4 comprising a cylindrical trunk 4a and a pair of first and second flanges 4b, 4c extending radially outwardly of the trunk 4a at its both lengthwise ends.

The spool shaft 3 rotatably supports at one end a pinion gear 6 at the side of first side frame 1. Between the pinion gear 6 and the spool 4 is provided a clutch 7 (described later) which is operated for engagement and disengagement by a clutch lever 81 of a clutch operating mechanism 8.

Between the doubling plate 12 and the cover 13 at the first side frame 1 is rotatably supported a handle shaft 31 through a support shaft 30. The handle shaft 31 projects at one end outwardly of the cover 13, and a handle 32 is fixed to the projecting portion of the handle shaft.

On the other end of the handle shaft are fitted and supported a master gear 33, friction plate 34 and return plate 35 having a plurality of return protuberances 35a.

The friction plate 34 and return plate 35 are fitted onto the handle shaft 31 not-rotatably relative thereto but rotatably therewith. The master gear 33 is freely fitted onto the handle shaft 31, and rotation force from the handle shaft 31 is transmitted to the master gear 33 through the friction plate 34.

The handle 32, handle shaft 31, master gear 33 and pinion gear 6 constitute a drive mechanism for the spool 4 in the abovesaid construction. The pressing force of friction plate 34 to the master gear 33 can be adjusted by a drag knob 36 screwed with the end of the handle shaft 31. The friction plate 34, master gear 33 and drag knob 36 constitute a drag mechanism.

The magnet brake B shown in FIG. 1 is so constructed that the electric conductor 41 is formed in a cylindrical shape having an inwardly extending flange 41a which flange is fixed to an outer face of the second flange 4c of spool 4 by a screw member 16. A non-magnetic holding member 42 is formed and is provided at its outer periphery with a holding portion 42a for the magnet 40, and at its center with an elliptical shaft bore 42b. The magnet 40 is held at the holding portion 42a to be opposite to an inner peripheral face of the electric conductor 41. The shaft bore portion 42b of holding member 42 is supported along the outer surface of the boss 24 in relation of being movable radially outwardly thereof. The bearing housing 21 is provided with a guide bore 22 formed away from the center of boss 24 for guiding radial movement of the holding member 42. The holding member 42 is provided at one side with an engaging projection 42c which is fitted into the guide bore 22. The boss 24 rotatably supports a disc-like shaped brake adjuster 43 which has a knob 43a for a turning operation and also has at its center a through bore 43b. The adjuster 43 is provided at the inner face with an arcuate cam groove 44 which extends along the periphery and inwardly toward the center. The engaging projection 42c which is fitted into the guide bore 22 of holding member 42 is adapted to engage with the cam groove 44.

The knob 43a portion is exposed outwardly from the cover 23 at the second side frame 2 to be operable outside, so that the adjuster 43 when operated turns to shift the engaging projection 42c in its engagement position with the cam groove 44 to thereby move the holding member 42 radially of the boss 24, thus adjusting an interval or distance between the magnet 40 (held at the holding member 42) and the electric conductor 41 to thereby control the braking force.

The clutch 7 is so constructed that the first flange 4b of spool 4 is provided at the outside portion with an engaging member 70 which has engaging pawls 71, 71 and is supported to the outside portion of flange 4b relatively not-rotatably. Between the pinion gear 6 and the engaging member 70 a transmission tubular member 72 with an engaging groove 73 is supported not-rotatably relatively to the pinion gear 6 but slidably thereto. The transmission tubular member 72 is engaged at its engaging grooves 73, 73 with the engaging pawl 71, 71 so that rotation transmitted to the pinion gear 6 is transmitted from the transmission tubular member 72 to the spool 4 through the pawl 71, 71.

The clutch operating mechanism 8 is so constructed that the clutch lever 81 is supported to the doubling plate 12 of first side frame 1 by means of a pin 83 projecting perpendicularly to the axis of spool shaft 3 and an elongate slot 84 at the lever 81 to be movable in reciprocation. The lever 81 is biased by a return spring (not shown) in the direction of backward movement of the lever, so that the clutch lever 81 when pushed moves the clutch yoke 82 axially of the spool shaft. The clutch opertaing mechanism 8 is operated to disengage the transmission tubular member 72 from the engaging pawls 71, 71, thereby enabling the spool 4 to rotate freely from the spool shaft 3.

Next, the cast-control means, the principal part of the invention, will be detailed.

The cast-control means is provided for applying a resistance to a free rotation of the spool 4 during a casting operation for the purpose of preventing a backlash of the fishing line as aforesaid, and comprises a cast-control member 50 and a contact member 60 having an annular contact portion 64 contacting the cast-control member 50.

The cast-control member 50 is supported to the second side frame 2 and is movable axially of the spool 4 member 50 is formed to have a rod-like shape and is screwably supported to the boss 24 of bearing housing 21 at the second side frame 2.

In more detail, the boss 24 is provided at the center with a threaded bore 24, the cast-control member 50 is provided at one lengthwise side with an outer peripheral threaded portion 53 screwable with the threaded bore 25, so that the cast-control member 50 can be screwably supported to the boss 24.

The cast-control member 50 is provided at its other lengthwise side with an operating portion 51 operable outside of the second side frame 2. The operating portion 51 is inserted into the through bore 43b at the adjuster 43 so that the end portion of operating portion 51 is exposed outwardly of the adjuster 43.

The cast-control member 50 is provided at the center of the one side (where the outer threaded portion 53 is formed) with a shaft bore 54 for receiving one axial end of the spool shaft 3 to support the same.

Between an end face of the shaft bore 54 and an end face of the spool shaft 3 is interposed a spring 55 for biasing the spool shaft 3 while simultaneously biasing the cast-control member 50 outwardly with respect to the boss 24 to thereby ensurely hold any adjustment position set by the cast-control member 50.

Figure 3:
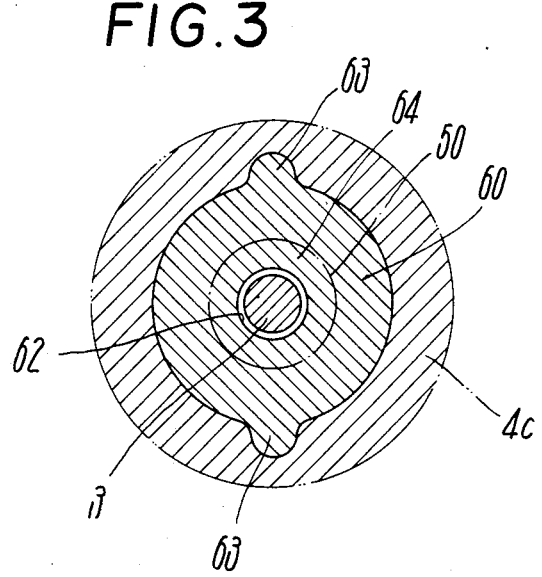
FIG. 3 is a sectional view taken on the line III—III in FIG. 1.

The contact member 60 contacts the cast-control member 50 constructed as abovesaid so as to apply a rotation resistance to the spool shaft 4. The contact member 60 is so constructed that it mainly employs a disc-like plate having mainly at the center a through bore 62 larger in diameter than the outer diameter of spool shaft 3 and smaller in diameter than the outer diameter of the cast-control member 50. The disc-like shaped contact member 60 is provided at the outer periphery with two or more projecting portions 63, as shown in FIG. 3, for holding the contact member in a manner of relatively not-rotatably with respect to the axial outer face of the spool 4.

Furthermore, the spool 4 is formed at its axial outer face with a recessed portion for receiving the outer peripheral portion of the contact member 60 having the projections 63, so that the outer peripheral portion of contact member 60 can be fitted to the recessed portion to be held by a predetermined fixing means.

According to the abovesaid construction, the contact portion 64 of contact member 60 around the through bore 62 faces cast-control member 50 and and can make contact with member 50 due to movement thereof, to thereby apply a rotation resistance directly to the spool 4.

In the embodiment shown in FIG. 1, to the spool 4 is fixed the electric conductor 41 constituting the magnet brake B by means of the screw member 16, so that the inwardly extending flange 41a of the electric conductor 41 is used for holding the contact member 60 to the spool 4.

Additionally, a receiving flange 3a is formed on the spool shaft 3 at the outside of bearing 5 and at the inside of contact member 60 for preventing the contact portion 64 of contact member 60 from axially inwardly deforming due to pressure caused by movement of the cast-control member 50.

The fishing reel according to the invention is constructed as abovesaid. Next, operation of the reel will be detailed.

First, the clutch 7 is operated to be in engagement so as to enable the fishing line to be wound onto the spool 4 by operating the drive mechanism. In turn, when the accordingly wound line onto the spool 4 is to be drawn out during a casting operation, the clutch lever 81 is operated to disengage the clutch 7 so as to cause the spool 4 to freely rotate.

Upon such operation, the cast-control member 50 is previously adjusted by being moved to a predetermined position so as to apply a desired rotation resistance to free rotation of the spool 4. Hence, backlash of fishing line can be prevented by both the rotation resistance applied by the cast-control member 50 and the braking force by the magnet brake B.

Additionally, the application of rotation resistance to the spool 4 by the cast-control member 50 is performed through contact of the cast-control member 50 with the contact portion 64 of the contact member 60, so that the operating force of the cast-control member 50 can be transmitted directly to the spool 4 irrespective of the bearing 5. As a result, the construction of the invention can eliminate and prevent the defects in the conventional fishing reels wherein the operating force of cast-control member 50 is transmitted from the inner race of bearing 5 to the outer race thereof to thereby cause the bearing 5 to be subjected to thrust load. In other words, application or affection of loads to the bearing portions can be prevented, according to the present invention so that the spool 4 can be freely rotated always smoothly, and generation of noises and a not-smooth heavy rotation with a shake at the bearing portions and the spool resultantly can be eliminated and prevented.

The abovesaid embodiment employs a magnet brake B, but may alternatively use a centrifugal brake in place thereof. Additionally, these brakes may be altogether eliminated.

Furthermore, the drive mechanism may be formed at the second side frame 2 other than at first side frame 1.

The features shown in the drawings are a typical embodiment of the invention. The invention should not be construed as limited to the specific constructions of the illustrated embodiment. Any modifications therefrom will be further embodied provided that they would not deviate from the spirit of the invention defined in the claims.

What is claimed is:

1. A fishing reel comprising:
(a) first and second side frames,
(b) a spool shaft supported between said first and second side frames,
(c) a spool supported rotatably to said pool shaft by means of a pair of bearings, said first and second side frames being respectively positioned at opposite axial sides of said spool,
(d) a drive mechanism for driving said spool,
(e) a clutch for releasing said spool from said drive mechanism,
(f) cast-control means for controlling casting of said reel to set said spool in free rotation, said cast-control means comprising a cast-control member which is supported to said second side frame positioned at one axial side of said spool and substantially coaxial with said spool shaft, said cast-control member being movable axially of said spool and having an actuating portion extending outside said second side frame,
(g) a contact member held non-rotatably at an axial outer face of said spool such that said contact member does not rotate relative to said spool, said contact member having a substantially flat annular contact portion adjacent a radially central part of said spool and surrounding said spool shaft for contacting an end face of said cast-control member, said contact member being positioned so that when said cast-control member is moved axially with respect to said spool, said cast-control member contacts said contact member and applies a rotation-resisting force by means of said contact member to said spool with respect to free rotation thereof, said spool shaft including a receiving flange for receiving inward deformation of said contact member and said receiving flange being positioned on said spool shaft at a position outside said bearings which rotatably support said spool and between said contact member and a said bearing.

2. A fishing reel comprising:
(a) first and second side frames,
(b) a spool shaft supported between said first and second side frames,
(c) a spool supported rotatably to said spool shaft by means of a pair of bearings, said first and second side frames being respectively positioned at opposite axial sides of said spool,
(d) a drive mechanism for driving said spool,
(e) a clutch for releasing said spool from said drive mechanism,
(f) cast-control means for controlling casting of said reel to set said spool in free rotation, said cast-control means comprising a cast-control member which is supported to said second side frame positioned at one axial side of said spool and substantially coaxial with said spool shaft, said cast-control member being movable axially of said spool and having an actuating portion extending outside said second side frame,
(g) a contact member held non-rotatably at an axial outer face of said spool such that said contact member does not rotate relative to said spool, said contact member having a substantially flat annular contact portion adjacent a radially central part of said spool and surrounding said spool shaft for contacting an end face of said cast-control member, said contact member being positioned so that when said cast-control member is moved axially with respect to said spool, said cast-control member contacts said contact member and applies a rotation resisting force by means of said contact member to said spool with respect to free rotation thereof, and (h) a magnet-type brake for applying a braking force against rotation of said spool, said brake comprising an electric conductor and a magnet opposite to said electric conductor, said electric conductor comprising a cylindrical member having a flange extending inwardly toward said spool shaft, and said electric conductor being fixed to an outer face of said spool through said inwardly-extending flange, so that said contact member is held at said outer face of said spool by said inwardly-extending flange.

* * * * *